US005299448A

United States Patent [19]

Maryyanek et al.

[11] Patent Number: 5,299,448

[45] Date of Patent: Apr. 5, 1994

[54] POSITIVE PRESSURE TEST APPARATUS FOR FACEPIECE RESPIRATOR

[75] Inventors: Richard D. Maryyanek, Northbridge; Joseph Z. Zdrok, Webster, both of Mass.; Keith Simpson, Farnham, England

[73] Assignee: Cabot Safety Corporation, Southbridge, Mass.

[21] Appl. No.: 27,218

[22] Filed: Mar. 5, 1993

[51] Int. Cl.[5] .......... G01M 3/36

[52] U.S. Cl. .......... 73/40

[58] Field of Search .......... 73/40, 37

[56] References Cited

U.S. PATENT DOCUMENTS

| | | | |
|---|---|---|---|
| 2,738,699 | 3/1956 | Silverman et al. | 73/40 |
| 3,486,366 | 12/1969 | Jackson | 73/40 |
| 3,580,051 | 5/1971 | Blevins | 73/40 |
| 4,574,799 | 3/1986 | Warncke | 128/206 |
| 4,765,325 | 8/1988 | Crutchfield | 128/202 |
| 4,796,467 | 1/1989 | Burt et al. | 73/168 |
| 4,832,011 | 5/1989 | Busch | 128/202 |
| 4,846,166 | 7/1989 | Willeke | 128/200 |
| 4,914,957 | 4/1990 | Dougherty | 73/40 |

*Primary Examiner*—Hezron E. Williams
*Assistant Examiner*—Joseph W. Roskos
*Attorney, Agent, or Firm*—Michelle B. Lando; Harry J. Gwinnell

[57] ABSTRACT

A positive pressure test apparatus for fit testing a facepiece respirator having an exhalation valve, including a cover portion having a central bore with an inwardly directed shoulder at the base. A plunger is provided having a stem, a button portion on one end and a flange portion on the opposite end. The stem is situated within the central bore, the button portion extending above the surface of the cover portion in a rest position, and the flange portion extending below the inwardly directed shoulder. Bias means are located in engagement with the button portion and the shoulder for biasing the plunger from the rest position to a depressed position, wherein the button is flush with the surface of the cover portion and the flange portion seals the exhalation valve. A mounting means is provided to attach the positive pressure test apparatus to the respirator.

14 Claims, 3 Drawing Sheets

POSITIVE PRESSURE TEST APPARATUS FOR FACEPIECE RESPIRATOR

BACKGROUND OF THE INVENTION

1. Field of the Invention

The present invention relates to a positive pressure test apparatus and, more particularly, to a facepiece respirator including a positive pressure test apparatus.

2. Description of the Prior Art

Facepiece respirators are commonly used as protection against inhaling airborne contaminants. The airborne contaminants may be gaseous or liquid droplets or solid particulates entrained in a gas such as air. Dusts, paint spray, mist, fumes and gaseous organic solvents are examples of such substances. These respirators are either of the positive pressure type where clean air is forced under pressure into the respirator for breathing by the user, or the negative pressure type where the inhalation of the user draws ambient environment into the respirator for breathing. In the latter instance, the respirator is provided with means, such as one or more filter cartridges, which extract airborne contaminants from the environment as it is drawn into the respirator, thereby rendering the environment suitable for breathing. Both types of respirators utilize exhalation valves, which are one-way valves used to prevent airborne contaminants from entering the respirator as the user exhales.

Leakage of contaminated ambient environment into the respirator, such as between the peripheral edges of the respirator and the user's face, is a serious consideration. Such leakage defeats the purpose of the respirator and results in the user inhaling the contaminant.

Three agencies are involved with the control, regulation or recommendation as to the acceptable practice in regard to respirator protection. These agencies are the National Institute of Occupational Safety and Health (NIOSH), Occupational Safety and Health Administration (OSHA), and American Congress of Governmental Industrial Hygiene (ACGIH). NIOSH has the principal responsibility for testing and certifying respiratory protection equipment to include both face pieces, cartridges and assemblies testing. Criteria is established by NIOSH based upon extensive medical evaluation of exposure levels for occupational substances.

OSHA has been mandated by Congress to establish safe workplace conditions and to promulgate laws to enforce such conditions. OSHA has public hearings before promulgation of such occupational levels. Once the law has been instituted by Congress, OSHA is mandated to enforce the newly passed legislation. Traditionally OSHA has promulgated laws to reflect the permissible exposure levels (PEL's) which establishes the average conditions employees cannot exceed.

ACGIH is an agency which has established occupational exposure levels to hazardous substances in the workplace since the 1930's. ACGIH has been a consensus industry standard and generally has established "Ceiling Concentrations" and Threshold Limit Values (TLV's) which define concentration levels to which nearly every worker can be exposed without any deleterious health effect. Time Weighted Average (TWA), another related measurement of concentration, is used within the health discipline to refer to average concentration per limit of time, normally an eight hour work day.

Respirators are typically tested against the TWA and/or TLV of a particular hazardous substance to establish the efficiency of the respirator. Each respirator and filter combination is tested for typical airborne contaminants for which the respirator and filter are intended to be effective.

The effectiveness of the negative pressure type respirators is largely determined by the filters used, as well as the fit of the respirator on the user's face. Alternatively, because a positive pressure type respirator utilizes clean air forced under pressure into the respirator without filters, the primary factor in determining its effectiveness is the leakage allowable. Leakage of a respirator of the positive pressure type can be determined by the fit of the respirator to the face of the user. The term "leakage" refers to the passage of the ambient environment into the interior of the respirator. To aid in establishing an effective seal between the respirator and the user's face, the respirator is provided with a resilient peripheral rim for engaging the face, and is held in position by a series of adjustable straps. An initial fitting operation involves selecting an appropriately sized respirator, applying the respirator to the user, placing the user in a controlled challenge atmosphere, causing the user to breath, and capturing a portion of the gas from inside the respirator for analysis for the "challenge" substance. This process, or other suitable quantitative test, is repeated as many times as necessary, with intervening fit adjustments until an acceptable level of the challenge substance is detected within the respirator.

Typically, qualitative fit tests of facepiece respirators are performed to verify that the respirator has been applied properly to the face. The tests should be performed in uncontaminated air, immediately before entering the contaminated area. If any leakage is detected, the respirator must be readjusted until there is no leakage. The procedure involves temporarily covering the outlet openings to the exhalation valve with one or two hands, or with a piece of tape, plastic film, paper or the like, and exhaling into the mask. The mask will become slightly distended if the seal to the user's face is acceptable. The fit is satisfactory if the facepiece remains in the distended condition for a period of about ten seconds and no outward leakage of air is detected. While blocking the exhalation valve is an effective method to fit check facepiece respirators of the positive pressure type, it is noted that the procedure can be difficult for the user, particularly when the user is wearing safety gloves or other safety equipment or carrying tools or the like. A respirator user's hands may be too small to cover the exhalation valve completely, or a piece of tape, paper or the like may not be immediately available. Additionally, the user's hands or gloves may be contaminated with a material which could damage the respirator mask.

It is therefore an object of this invention to provide a positive pressure test apparatus which is easy to use, readily available and sanitary. It is a further object of this invention to provide a respirator including a facepiece and a positive pressure test apparatus mounted to the facepiece.

SUMMARY OF THE INVENTION

According to the present invention, a positive pressure test apparatus for a facepiece respirator having an exhalation valve is provided. The apparatus includes a cover portion having a central bore and an inwardly directed shoulder at the base of the bore. A plunger, comprising a stem, having a button portion on one end and a flange portion on the opposite end is provided, wherein the button and flange portions have diameters greater than the stem. The flange portion is sized and shaped to cover the effective area of the exhalation valve. The stem is situated within the central bore, and the button portion extends above the surface of the cover portion in a rest position while the flange portion extends below the inwardly directed shoulder. Bias means are located in engagement with the button portion and the shoulder for biasing the plunger from the rest position to a depressed position, where the button is flush with the surface of the cover portion and the flange portion seals the exhalation valve. Lastly, mounting means are provided for attaching the positive pressure test apparatus to the respirator.

The positive pressure test apparatus of the present invention is utilized with a facepiece respirator having an exhalation valve. The test apparatus is used to verify that the respirator has been applied properly to the face. The test should be performed immediately before entering a contaminated area. The respirator is placed over a user's head and face and adjusted until comfortably and securely in position. Once in place, the button portion of the positive pressure test apparatus is depressed, thereby biasing the plunger from the rest position to the depressed position wherein the button is flush with the surface of the cover portion and the flange portion seals the exhalation valve. While depressing the button portion, the user exhales into the respirator such that the respirator is distended for a predetermined period of time. The facepiece fit is considered satisfactory if the facepiece remains in its slightly distended condition for the duration of the test and no outward leakage of air is detected. After the predetermined period of time, the button portion is released, thereby biasing the plunger from the depressed position to the rest position wherein the button portion extends above the surface of the cover portion and the flange portion is removed from the exhalation valve allowing the user to exhale through the exhalation valve.

BRIEF DESCRIPTION OF THE DRAWINGS

The foregoing and other objects and advantages will be more fully appreciated from the following drawings in which.

DETAILED DESCRIPTION OF THE INVENTION

The present invention is directed to a positive pressure test apparatus for facepiece respirators.

Figure 1B:
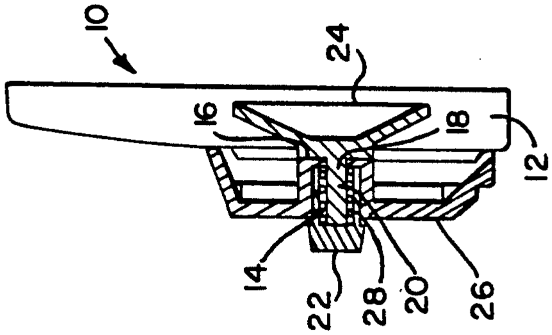
FIG. 1B is a cross-sectional side view of the positive pressure test apparatus taken along line 1B—1B of FIG. 1A.
Figure 1A:
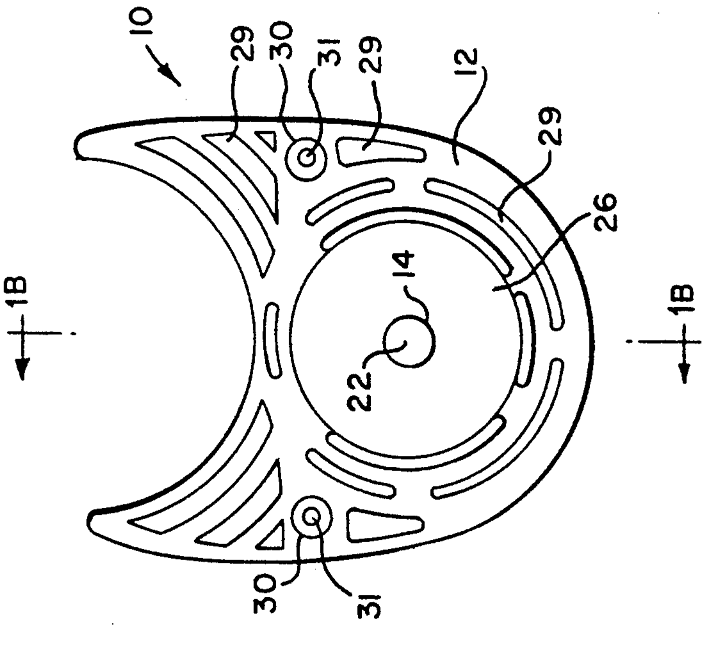
FIG. 1A is a front view of a positive pressure test apparatus of the present invention.

Referring to FIGS. 1A and 1B, there is shown a positive pressure test apparatus for a facepiece respirator having an exhalation valve. Positive pressure test apparatus 10 includes a cover portion 12 having a central bore 14 with an inwardly directed shoulder 16 located at the base of the bore. A plunger 18 is provided, having a stem 20 which includes a button portion 22 on one end and a flange portion 24 on the opposite end. The button and flange portions 22, 24 have diameters greater than stem 20. Flange portion 24 is sized and shaped to cover the effective area of the exhalation valve (not shown). Stem 20 is situated within central bore 14. Button portion 22 extends above surface 26 of cover portion 12 in a rest position, while flange portion 24 extends below the inwardly directed shoulder 16. Bias means 28 are located in engagement with button portion 22 and shoulder 16 for biasing plunger 18 from the rest position to a depressed position, wherein button portion 22 is flush with surface 26 of cover portion 12, and flange portion 24 seals the exhalation valve. Lastly, mounting means 30 are provided for attaching the positive pressure test apparatus to a facepiece respirator (not shown).

Cover portion 12 is sized and shaped to house plunger 18. Typically, cover portion 12 is made of a rigid, light weight material. Preferably, cover portion 12 is made of a rigid, light weight plastic material such as polycarbonate, nylon, high-density polyethylene, polypropylene, polyvinyl chloride, or other readily available, inexpensive, high-impact strength material which can be easily formed into the size and shape required by the particular respirator application. It is noted that cover portion 12 can be manufactured in various sizes and shapes, to allow for retrofitting of existing facepiece respirators, and other materials known to those of skill in the art can be used to provide an impact resistant, light weight housing for the positive pressure test apparatus.

Cover portion 12 generally includes vents 29 which provide an exhaust opening for the user to exhale freely when not performing a positive pressure test. Vents 29 may be sized and shaped in any manner, provided they allow for exhalation without adversely affecting the structural integrity of cover portion 12. Cover portion 12 also has mounting means 30 for attaching the positive pressure test apparatus to a facepiece respirator. Mounting means 30 are typically threaded bores in cover portion 12, which correspond with threaded inserts located in the respirator, through which machine screws 31 are secured to attach the positive pressure test apparatus to the respirator. It is noted that various other mounting means such as snaps, clips, adhesives, or tapes can be used by those of skill in the art to rigidly or removably secure cover portion 12, and the positive pressure test apparatus, to a respirator.

Central bore 14 is typically cylindrically shaped, having an inside diameter slightly larger than the outside diameter of button portion 22, thereby allowing for the button portion to be depressed within the bore. At the base of bore 14, an inwardly directed shoulder 16 is provided with an inside diameter slightly larger than the outside diameter of stem 20. Shoulder 16 also provides a ledge, or rim, for engaging bias means 28, as well as a rim for resting flange portion 24 when the positive pressure test apparatus is in the rest position.

As noted above, plunger 18 includes stem 20 which has button portion 22 on one end and flange portion 24 on the opposite end. Typically, either button portion 22, flange portion 24, or both portions, are detachably connected to the stem to provide for standard maintenance such as cleaning and/or repair, as well as assembly of the apparatus. It is noted, however, that plunger 18 can also be manufactured as a unitary construction.

Button portion 22 is cylindrically shaped and has an outside diameter slightly smaller than that of the inside diameter of bore 14. Button portion 14, however, may be alternatively shaped as long as it corresponds to the shape of bore 14. Stem 20 is also cylindrically shaped, and serves primarily as a bridge between the button and flange portions. The outside diameter of stem 20 is smaller than that of button and flange portions 22, 24 and provides a void within bore 14, which bias means 28 is located. Flange portion 24 is typically frusto-conical shaped and is sloped at a predetermined angle such that the base can seal the effective area of the exhalation valve. It is noted that flange portion 24 can be other sizes and shapes known to those of skill in the art, provided the effective area of the exhalation valve of a facepiece respirator is sealed when positive pressure test apparatus 10 is in a depressed position. In a preferred embodiment, flange portion 24 will also have a minimum clearance (in the rest position) between itself and the exhalation valve in order to minimize any resistance during exhalation of a user during normal use. Especially preferred is a clearance of about 7.0 mm to allow the exhalation valve to open fully with the exhalation of a user without interference of flange portion 24. As noted above, bias means 28 is located in engagement with the bottom surface of button portion 22 and the inner surface of shoulder 16 for biasing plunger 18 from a rest position to a depressed position. In a rest position, button portion 22 extends above surface 26 of cover portion 12, while flange portion 24 extends below, and rests upon, inwardly directed shoulder 16. In a depressed position, the top surface of button portion 22 is flush with surface 26 of cover portion 12, and flange portion 24 seals the facepiece respirator's exhalation valve. Typically, bias means 28 is a compression coil spring. It is understood by those of skill in the art, however, that various other types of bias means such as foam rubber, air filled cavities, or various other types of springs are available to bias the plunger from a rest to a depressed position.

The positive pressure test apparatus 10 of the present invention is used to verify that a respirator has been properly applied to a user's face. Once the respirator is placed over the user's head and face, and adjusted for comfort and proper fit, button portion 22 is depressed with a finger of the user, thereby biasing plunger 18 from a rest position to a depressed position, wherein button portion 22 is flush with surface 26 of cover portion 12, and flange portion 24 seals the respirator's exhalation valve. The user then exhales into the respirator while simultaneously depressing button portion 22, such that the respirator is distended for a predetermined period of time. The facefit factor is considered satisfactory if the facepiece remains in its slightly distended condition for the duration of the test and no outward leakage of air is detected. After the predetermined period of time, button portion 22 is released thereby biasing plunger 18 from the depressed position to the rest position. In the rest position, button portion 22 extends above surface 26 of cover portion 12 and flange portion 24 is removed from the exhalation valve, thereby allowing the user to exhale through the exhalation valve and through vents 29.

Figure 2:
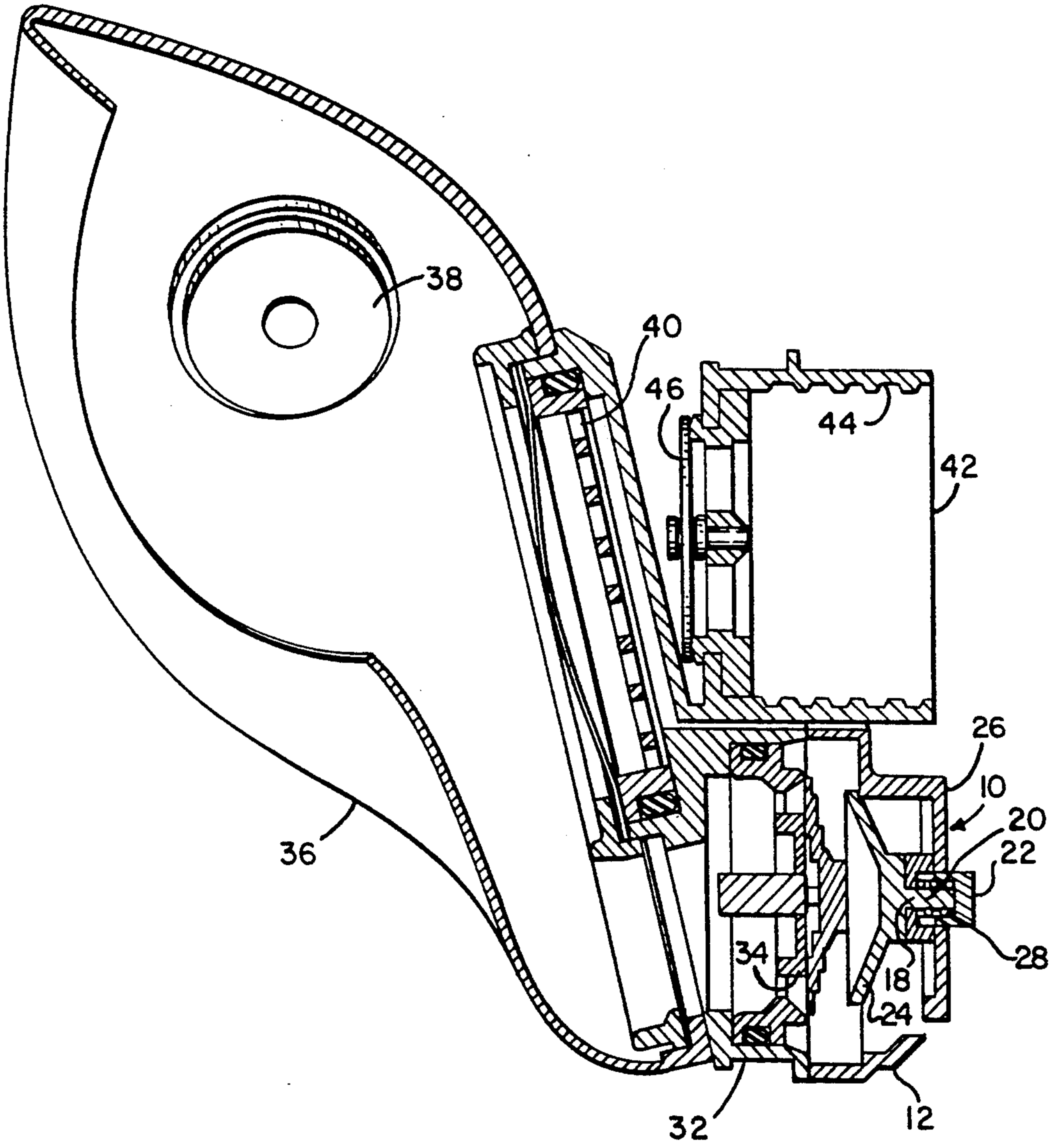
FIG. 2 is a cross-sectional side view of the positive pressure test apparatus mounted to an inner mask section of a facepiece respirator.

Referring now to FIG. 2, there is shown a cross-sectional side view of positive pressure test apparatus 10 mounted to an inner mask section of one type of facepiece respirator.

Cover portion 12 is shown attached to the respirator front fitting 32. Exhalation valve 34 is housed by cover portion 12 such that flange portion 22 will seal the exhalation valve when button portion 22 is depressed. Front fitting 32 is connected to inner mask 36, which is situated within the respirator's main mask section (not shown). Inner mask 36 generally covers the user's face from under the chin to the nose bridge. A nose cup inhalation valve 38 allows for air flow into inner mask 36, which is exhaled through exhalation valve 34. Speech panel 40 is also attached to inner mask 36 and allows the user to communicate while wearing the facepiece respirator. An air hose port 42, having threads 44 for receipt of an air supply is typically adjacent to speech panel 40. An inhalation valve flap 46 is used to prevent exhalation through port 42. Typically, air enters through the air hose port 42, through inhalation valve 46 and into the main mask section (not shown). Air then enters the inner mask 36 through nose cup inhalation valve 38 when the user inhales.

Figure 3:
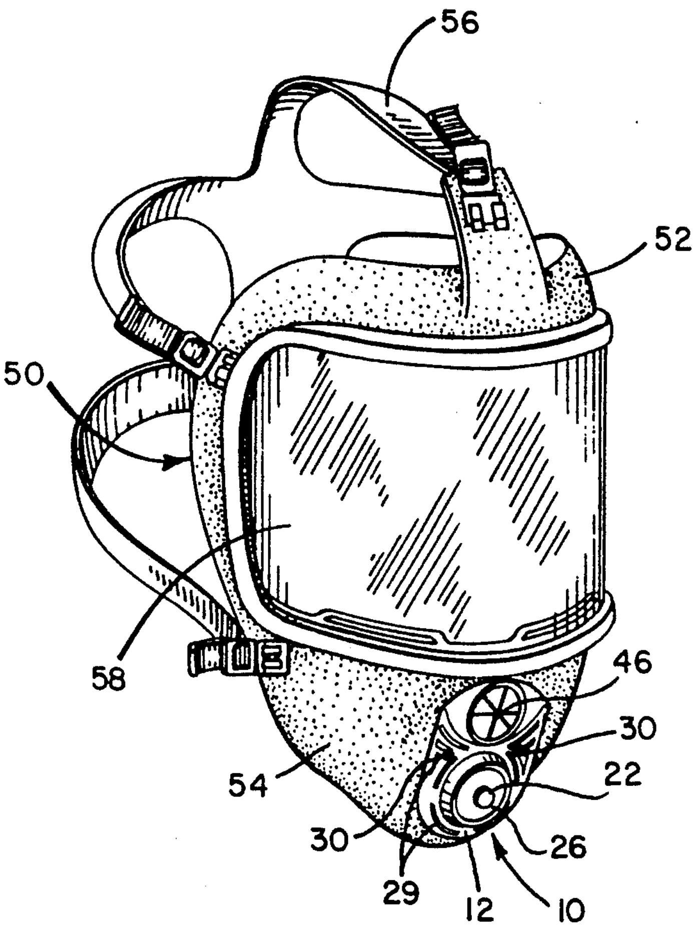
FIG. 3 is a perspective side view of a full facepiece respirator with the positive pressure test apparatus mounted thereto.

Referring now to FIG. 3, the positive pressure test apparatus 10 is shown attached to a full facepiece respirator 40. Cover portion 12, as described above, is attached to respirator 50 by mounting means 30 positioned below inhalation valve 46. Full facepiece respirator 50 typically includes facepiece 52, main mask section 54, head harness 56, and visor 58. It is noted, however, that the positive pressure test apparatus of the present invention can be used with other types of facepiece respirators, including quarter-mask types which generally cover the mouth and nose of the user, as well as half-mask types which generally fit over the nose and around the user's mouth and under the user's chin. These type of respirators, as well as the full facepiece respirator, shown in FIG. 3, utilize an exhalation valve over which the positive pressure test apparatus of the present invention may be mounted and utilized in performing positive pressure tests to insure proper fit of the respirator.

The present invention will be further illustrated by the following examples, which are intended to be illustrative in nature and are not to be construed as limiting the scope of the invention.

EXAMPLE I

One suitable construction of a positive pressure test apparatus having a shape and design substantially in accordance with the present invention is provided by the following combination of elements.

The positive pressure test apparatus includes a cover portion which is generally semi-ovular shaped, having a top portion which conforms with the bottom circular portion of a respirator's inhalation valve or port. The cover portion has a width of approximately 2.375 inches, a height of approximately 2.69 inches (at its highest points), and a thickness of approximately 0.72 inch (to the flat surface). The cover portion includes a central bore which is cylindrically shaped, and has an inside diameter of approximately 0.27 inch. The bore is approximately 0.42 inch deep and has an inwardly directly shoulder, having an inside diameter of about 0.125 inch at the base of the bore. A plunger is provided having a cylindrically shaped stem with a diameter of about 0.12 inch and a length of about 0.345 inch. The stem also has a threaded end portion of about 0.075 inch, upon which the button portion is secured. The button portion is also cylindrically shaped having a diameter of approximately 0.26 inch and a length of about 0.22 inch. The threaded end of the stem screws into a recessed bore in the inner side of the button portion. A flange portion is fixed at the opposite end of the stem. The flange portion has a cylindrically shaped neck with a diameter of approximately 0.42 inch and a width of approximately 0.09 inch. The flange portion flares outwardly at an angle of approximately 30° until the flange has an outside diameter of approximately 1.16 inch.

The positive pressure test apparatus is assembled by placing the stem within the central bore by inserting the stem through the bore from the inside surface of the cover portion such that the neck of the flange portion rests against the outer side of the shoulder. A compression coil spring made of music wire with an outside diameter of approximately 0.072 inch, a wire diameter of about 0.01 inch, a free length of approximately 0.4375 inch, and a pitch of about 0.09 inch is then inserted within the bore, around the stem. The button portion is then screwed onto the threaded end of the stem and the spring is then engaged with both the button portion and the shoulder, for biasing the plunger from a rest position to a depressed position.

The positive pressure test apparatus is then mounted to a facepiece respirator (for example, to an AO 7 STAR TM Full Facepiece Air-Purifying Respirator available from Cabot Safety Corporation, Southbridge, Massachusetts) by inserting machine screws through two threaded bores in the cover portion and into threaded inserts placed into the facepiece respirator.

EXAMPLE II

To determine if the positive pressure test apparatus had any affect on the facefit (protection) factor of the facepiece respirator it is mounted to, seven sample respirators, each including the positive pressure test apparatus as described in EXAMPLE I, where tested to determine the facefit factor. The facefit factor is calculated by dividing the particle concentration measured outside the respirator by the particle concentration measured inside the respirator. A Portacount ® quantitative test device (TSI Corporation) was used to conduct the facefit test. The device operates by continuously sampling and counting submicrometer particles that have been grown to an easily detectable size by condensing alcohol vapor around them. In the device, the sampled aerosol is first saturated with alcohol vapor while passing through a saturator tube. The alcohol is then cooled in a condenser tube where alcohol vapor condenses on the particles, causing them to grow into larger droplets. The particle concentration is determined by counting the individual droplets using a conventional optical technique. The experimental results are reported in Table 1.

TABLE 1

| Sample | Facefit Factor |
|---|---|
| 1 | 181,000 |
| 2 | 94,900 |
| 3 | 65,000 |
| 4 | 233,000 |
| 5 | 65,600 |
| 6 | 97,000 |
| 7 | 135,000 |

The test results show facefit factors ranging from 65,000 to 233,000, well above the recommended industrial factor of 1,000. These results indicate that the test apparatus does not adversely affect the facefit factor of a facepiece respirator.

EXAMPLE III

An exhalation resistance test was also performed to determine if facepiece respirators including the positive pressure test apparatus of the present invention provides exhalation resistance equivalent to a facepiece respirator without the test apparatus. The test was performed by first attaching a facepiece respirator to a testing device for respiratory protective devices, such as the device disclosed in Jackson, U.S. Pat. No. 3,486,366, or Burt et al. in U.S. Pat. No. 4,796,467, which includes a manikin test head, with a tube extending from the mouth area through the back of the head to an exhaust pump. A rotometer was connected in series with the test head, and air flow was adjusted to approximately 85 liters per minute (LPM). An in-line manometer was also connected in series with the rotometer and test head. Prior to placing the respirator on the test head, the resistance was adjusted to zero with the use of the manometer with air flowing through the test head at 85 LPM. A control facepiece respirator (Sample 1), having a standard exhalation valve cover (without the positive pressure test apparatus of the present invention), was mounted on the testing device. A resistance test was conducted, and the resistance was read out in millimeters $H_2O$ on the in-line manometer. The control provided a bench mark to determine whether the test apparatus adds any resistance to a standard facepiece respirator assembly. The procedure was repeated with seven sample facepiece respirators including the positive pressure test apparatus as described in EXAMPLE I. The experimental results are reported in Table 2.

TABLE 2

| Sample | Exhalation Resistance (mm $H_2O$) |
|---|---|
| 1 (control) | 10.5 |
| 2 | 10.5 |
| 3 | 10.5 |
| 4 | 10.5 |
| 5 | 10.5 |
| 6 | 10.5 |
| 7 | 10.5 |
| 8 | 10.5 |

The test results indicate that there was no detectable difference in exhalation resistance between a standard respirator exhalation valve cover (Sample 1) and a respirator including the positive pressure test apparatus mounted over the exhalation valve (Samples 2-8).

EXAMPLES II and III illustrate that the positive pressure test apparatus of the present invention provides an effective method for user's to test a respirator's fit, resulting in high facefit factors, while not increasing exhalation resistance.

Although particular embodiments of the invention have been described in detail for purposes of illustration, various modifications may be made without departing from the spirit and scope of the present invention.

What is claimed is:

1. A positive pressure test apparatus for a facepiece respirator having an exhalation valve, comprising:

a cover portion comprising a central bore having an inwardly directed shoulder at the base of said bore;

a plunger, comprising a stem having a button portion on one end and a flange portion on the opposite end, said button and flange portions having diameters greater than said stem, said flange portion being sized and shaped to cover the effective area of said exhalation valve, wherein said stem is situated within said central bore, said button portion extends above the surface of said cover portion in a rest position, and said flange portion extends below said inwardly directed shoulder;

bias means located in engagement with said button portion and said shoulder for biasing said plunger from said rest position to a depressed position wherein said button is flush with the surface of said cover portion and said flange portion seals said exhalation valve; and mounting means for attaching said positive pressure test apparatus to said respirator.

2. The apparatus of claim 1 wherein said facepiece respirator is a full facepiece respirator comprising a main mask section, an inner mask section, a head harness and a visor.

3. The apparatus of claim 1 wherein said plunger is made of a rigid material, and said stem, button portion and flange portion are a unitary construction.

4. The apparatus of claim 1 wherein said button portion is detachably connected to said stem.

5. The apparatus of claim 1 wherein said flange portion is detachably connected to said stem.

6. The apparatus of claim 1 wherein said button and flange portions are detachably connected to said stem.

7. The apparatus of claim wherein said flange portion is frusto-conical shaped and is sloped at an angle of about a 30° relative to said stem.

8. A full facepiece respirator comprising:

a facepiece having a main mask section, and inner mask section, a head harness, and a visor, wherein the main mask section has a front port, which communicates with the inner mask section, in which an exhalation valve is positioned; and a positive pressure test apparatus comprising a cover portion comprising a central bore having an inwardly directed shoulder at the base of said bore, a plunger comprising a stem having a button portion on one end and a flange portion on the opposite end, said button and flange portions having diameters greater than said stem, said flange portion being sized and shaped to cover the effective area of said exhalation valve, wherein said stem is situated within said central bore, said button portion extends above the surface of said cover portion in a rest position, and said flange portion extends below said inwardly directed shoulder, bias means located in engagement with said button and said shoulder for biasing said plunger from said rest position to a depressed position wherein said button is flush with the surface of said cover portion and said flange portion seals said exhalation valve, and mounting means for attaching said positive pressure test apparatus to said main mask section.

9. The respirator of claim 8 wherein said plunger is made of a rigid material, and said stem, button portion and flange portion are a unitary construction.

10. The respirator of claim 8 wherein said button portion is detachably connected to said stem.

11. The respirator of claim 8 wherein said flange portion is detachably connected to said stem.

12. The respirator of claim 8 wherein said button and flange portions are detachably connected to said stem.

13. The respirator of claim 8 wherein said flange portion is frusto-conical shaped and is sloped at an angle of about 30° relative to said stem.

14. A method of fit testing a facepiece respirator having an exhalation valve and a positive pressure test apparatus comprising a cover portion having a central bore, a plunger, having a stem with a button portion on one end and a flange portion on the opposite end, wherein said stem is situated within said central bore, said button portion extends above the surface of said cover portion in a rest position, and bias means for biasing said plunger from said rest position to a depressed position, comprising:

(a) placing said respirator over a user's head and face and adjusting said respirator until comfortable and securely in position;

(b) depressing said button portion, thereby biasing said plunger from said rest position to said depressed position wherein said button is flush with the surface of said cover portion and said flange portion seals said exhalation valve;

(c) exhaling into said respirator, while said plunger is in said depressed position, such that said respirator is distended for a predetermined period of time; and (d) releasing said button portion, thereby biasing said plunger from said depressed position to said rest position wherein said button portion extends above the surface of said cover portion and said flange portion is removed from said exhalation valve allowing said user to exhale through said exhalation valve.

* * * * *